United States Patent [19]

Brown et al.

[11] Patent Number: 5,339,292
[45] Date of Patent: Aug. 16, 1994

[54] ACOUSTIC TRANSDUCER

[75] Inventors: William J. Brown; Bogdan Cherek; Henry T. Viuhko, all of Peterborough, Canada

[73] Assignee: Milltronics Ltd., Peterborough, Canada

[21] Appl. No.: 952,812

[22] Filed: Sep. 28, 1992

[30] Foreign Application Priority Data

Sep. 27, 1991 [GB] United Kingdom ............. 9120580.7

[51] Int. Cl.⁵ .................. H04R 1/28; H04R 17/00
[52] U.S. Cl. .................. 367/176; 367/162; 310/334
[58] Field of Search ............ 367/140, 152, 165, 173, 367/162, 176; 310/311, 340, 348, 334

[56] References Cited

U.S. PATENT DOCUMENTS

| | | |
|---|---|---|
| 3,674,945 | 7/1972 | Hands .................. 310/334 |
| 3,803,545 | 4/1974 | Van Dyck et al. .......... 367/152 |
| 4,078,160 | 3/1978 | Bost .................. 310/331 |
| 4,183,007 | 1/1980 | Baird .................. 367/119 |
| 4,297,607 | 10/1981 | Lynnworth et al. .......... 310/334 |
| 5,038,067 | 8/1991 | Tabin .................. 310/334 |

FOREIGN PATENT DOCUMENTS 1423061 1/1976 United Kingdom .
2186465A 8/1987 United Kingdom .

OTHER PUBLICATIONS

'Ultrasonic Transducers', Milltronics, Sep. 1984.

Primary Examiner—Ian J. Lobo
Attorney, Agent, or Firm—Ridout and Maybee

[57] ABSTRACT

A piezoelectric acoustic transducer for coupling acoustic energy to a gaseous atmosphere in a pulse-echo ranging system has a tubular housing closed at one end by a thin integral wall to which a radiating plate of a transducer assembly is coupled to radiate acoustic energy by means of a layer of acoustically transmissive matching material. The transducer assembly except for its radiating surfaces is wrapped in an acoustic decoupling material such as cork, and the side wall of the tubular housing, which has a mounting ring behind the transducer assembly, is also internally lined with such material, space around and behind the transducer assembly within the housing being filled with a slightly elastomeric potting compound. This arrangement decouples the mounting ring from the transducer assembly, thus stabilizing the ringing characteristics of the transducer.

6 Claims, 1 Drawing Sheet

ACOUSTIC TRANSDUCER

BACKGROUND OF THE INVENTION

1. Field of the Invention

This invention relates to piezoelectric acoustic transducers for use in acoustic pulse-echo ranging systems.

2. Review of the Art

In order to obtain satisfactory results when using such a transducer, it is desirable that the ringing characteristics of the transducer be carefully controlled. By "ringing" is meant the continued resonance of the transducer following the end of its transmission of a pulse of acoustic energy. In general, whilst it is desirable that such ringing should decay as rapidly as possible so that it does not mask wanted return echoes, excessive damping of the transducer to reduce ringing is to be avoided since it greatly reduces transducer efficiency in both transmitting and receiving modes. Not only is it difficult to obtain consistent ringing performance as between different transducers of the same nominal characteristics, but ringing performance can be substantially effected by environmental factors such as temperature and the physical mounting of the transducer.

More specifically, it has proved difficult to mount transducers without significant acoustic energy from the transducer being transmitted to the supporting structure, and in some instances this structure may act as a sounding board which can greatly aggravate the ringing problem in a manner which is difficult to predict or control. Efforts have therefore been made to design mountings for such transducers which minimize the transmission of acoustic energy by one means or another but the mounting of transducers to provide consistent ringing performance remains an art rather than a science.

SUMMARY OF THE INVENTION

In order to address this problem, we have endeavoured to produce a transducer in which the transmission of acoustic energy to the transducer mounting is sufficiently reduced that the actual mounting configuration becomes less significant. Not only does this reduce the effect of the mounting on ringing performance, but it allows the transducer to be provided with a multipurpose mounting to suit different applications without significant prejudice to ringing performance.

According to the invention, there is provided an acoustic transducer comprising a hollow moulded synthetic plastic housing having a side wall of generally tubular form, such housing being closed at one, front end and provided with external peripheral mounting means at a rear, open end, the front end being closed by a thin integral membrane; an active transducer subassembly located within a front portion of said housing forward of said mounting means and coupled to a gaseous atmosphere into which the transducer is to radiate by a layer of acoustically transmissive matching material between the membrane and the subassembly; a layer of acoustic decoupling material surrounding the rear and sides of said subassembly; a mass of potting compound surrounding said acoustic decoupling layer and filling at least said front portion of the housing to retain said subassembly therein; and a further layer of acoustic decoupling material between said potting compound and said side wall adjacent said external peripheral mounting means.

More specifically, the acoustic transducer has an active portion comprising a substantially rigid plate having a front substantially planar radiating surface, coupling means applied to the radiating surface and comprising at least one layer of acoustic propagation material of acoustic impedance intermediate between that of the material of the plate and that of a gaseous atmosphere into which the plate is to radiate, coupling means applied to the radiating surface and comprising at least one layer of acoustic propagation material of acoustic impedance intermediate between that of the material of the plate and that of an atmosphere into which the plate is to radiate, a driver assembly rigidly secured to an opposite rear surface of the plate and comprising a loading block, a piezoelectric element between the loading block and the plate, means maintaining the piezoelectric element acoustically coupled to the plate and to the loading block, and means establishing electrical connections to the piezoelectric element to permit excitement of the latter at a predetermined frequency and on an axis of the driver assembly perpendicular to the radiating surface; and a passive portion comprising an elongated tubular housing, moulded from a synthetic resin and defining a passage which is open at one end and closed at an opposite end by a thin, integral wall coupled by said coupling means to the plate, the housing having internal cross-section dimensions greater than those of said plate and said driver assembly and a longitudinal axis common with that of said driver assembly, a wrapping of acoustically decoupling material surrounding the plate and driver assembly except for the front surface of the plate; a mass of somewhat elastomeric potting compound surrounding said wrapping within the housing and mounting the assembly within said other end of the passage with the coupling means contacting said thin integral end wall, an external mounting ring through which the transducer is mounted, the mounting ring surrounding the housing to the rear of the loading block of the driver and a layer of acoustic decoupling material between the housing and the potting material within the mounting ring.

SHORT DESCRIPTION OF THE DRAWING

Further features of the invention will be apparent from the following description of a preferred embodiment of the invention with reference to the accompanying drawing in which the sole FIGURE shows in vertical diagram cross-section a transducer for use in a pulse-echo acoustic ranging system.

DESCRIPTION OF THE PREFERRED EMBODIMENT

Figure 1:
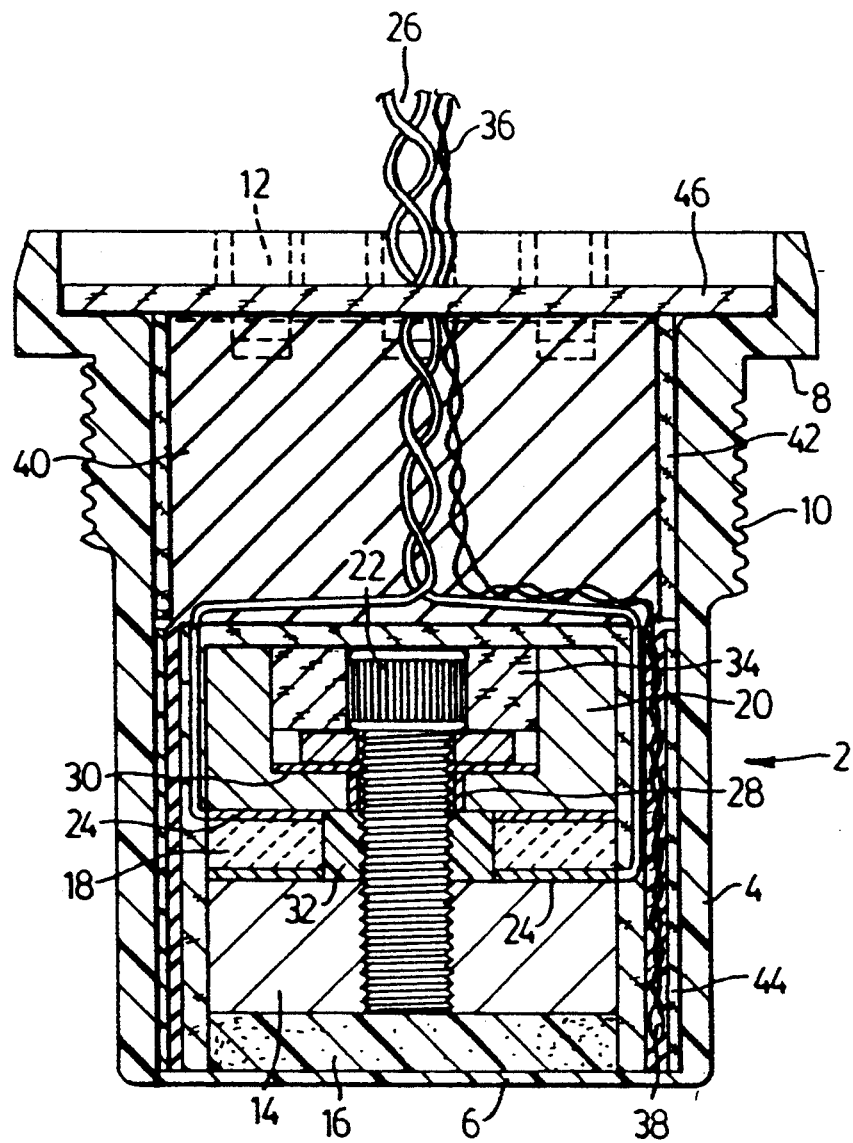

The transducer comprises a housing 2 moulded in one piece from a tough and relatively acoustically absorbent synthetic plastic, which is selected to be resistant to the possibly severe temperature and atmospheric conditions under which the transducer may be utilized. A suitable material is EFTE (ethylene-tetrafluorethylene copolymer) such as that sold under the trade mark TEFZEL by Dupont. The housing has a generally cylindrical and comparatively thick (3 mm) cylindrical side wall 4, and a very thin integral bottom wall 6 having a thickness of about 0.5 mm. At its top end, the housing is formed with a radially outwardly extending flange 8 beneath which is an integral mounting ring 10 externally surrounding the side wall. In the example shown, this ring is provided with a suitable external thread, but the thread may be replaced by locking pins for engaging a mounting flange with a bayonet coupling, or other suitable means for locking the mounting ring 10 and flange 8 in engagement with a wall of structure in which the transducer is to be mounted. The flange 8 may be provided with means such as bores 12 for securing to it a further assembly such as an instrument housing (not shown) containing an pulse echo ranging device associated with the transducer.

Within the housing 2 and in contact with its bottom wall 6 is an active portion or subassembly of the transducer, comprising a radiating plate 14, formed in this example by a thick, rigid disk of aluminium with a front (lower as seen in the drawing) radiating face which is planar and coupled to the air by the wall 6 and a layer 16 formed by a disk of acoustic propagation material of an acoustic impedance intermediate between that of the plate 14 and the atmosphere, typically air, in which the transducer is to be utilized. A suitable material is a closed-cell polyurethane foam, bonded both to the plate 14 and the wall 6 so that the layer 16 and wall 6 coact to form a coupling layer.

The subassembly further includes a driver assembly, for example of about 3.8 cm diameter, secured to the rear of the plate 14, this assembly comprising an annular element 18 of piezoelectric ceramic material such as lead zirconate-titanate, a loading block 20, typically of steel, and a socket screw 22 securing the assembly to the plate 14 so that the element 18 is clamped between the plate and the loading block and acoustically coupled thereto to provide an assembly which oscillates in axial mode when energized. Electrical connections to the element 18 are established through brass washers 24 and insulated conductor wires 26, short circuiting of the element through the screw 22 being avoided through use of insulating washers or rings 28, 30 and 32. Additional wires 36 lead to a thermistor 38 between the driver and the wall 4 to sense the temperature at that location. The side and rear surfaces of the disk 16, the plate 14 and the driver assembly are wrapped with an adhesively secured layer of cork 34, and the entire cork wrapped subassembly of active components is embedded in potting compound 40 which is poured into the housing 2. This potting compound, typically a polysulphide adhesive and sealant is selected to be slightly elastomeric. Further cork layer 42 and 44 are adhesively secured to the wall 4 between the potting compound and the inside surface of the wall 4 adjacent the mounting ring 10 and the driver assembly. A further layer of cork 46 covers the potting compound and an inside surface of flange 8, and helps isolate the structure mounted on the flange 8 from acoustic energy transmitted through the compound 40. The layers of cork 42, 44 may be about 3 mm thick, and the layer 46 about 1.5 mm thick.

The dimensions of the components are such that the active transducer subassembly, including the loading block, is located forward (downward as shown in the drawing) of the mounting ring 10.

Whilst the pattern of transmission of acoustic energy within the transducer is complex, and we do not wish to be bound by any particular theoretical explanation of the invention, we find that a construction of the above general type provides a sufficient isolation of the active components of the transducer from the mounting ring 10 and flange 8 that a substantially consistent ringing performance can be obtained in a wide range of different installations. A combination of factors is presently believed to contribute to this.

Firstly, a substantial part of the total mass and bulk of the transducer assembly is formed by materials such as that of the housing 2, the potting compound 40 and the cork 34, which in combination form a structure which is not an efficient propagator of acoustic energy, the bulk of these materials being interposed between the active portion of the transducer and its mounting. In the example shown, the active transducer subassembly provides a little more than half of the mass of the transducer as a whole. In practice this subassembly should preferably form no less than about 25% and no more than about 75% of the mass of the transducer. At the comparatively low frequencies we commonly use in pulse-echo ranging systems, for example about 45 kHz, in order to obtain adequate range in typical atmospheres to which the transducer is coupled, the transducer assembly is necessarily comparatively large, and to keep the transducer reasonably compact, the subassembly will usually have a diameter which is at least 75% of the internal diameter of the housing.

Secondly, the housing does not provide a rigid wall behind the active portion of the transducer which might act to transmit energy to the mounting: any such transmission though structure secured to the flange 8 is reduced by the layer 46.

Thirdly, both the radiating plate and the loading block, which are moved in antiphase by the piezoelectric element, are both located forwardly of the mounting ring, the former more than the latter. Finally, the external location of the mounting ring and the slightly elastomeric nature of the potting compound combined with the attenuating effect of the cork layers 42 and 44 is believed to result in substantial reduction of energy transmission in a radial rather than an axial direction, and in coupling of the transducer assembly to the wall 4.

The effectiveness of the invention in reducing unwanted transfer of acoustic energy from the transducer to adjacent structures is illustrated by the observation that the loading of the flange 8 by the mounting of a measuring instrument thereon, with a mass which is substantial relative to that of the transducer, has little effect on the ringing performance of the transducer. This indicates that comparatively little acoustic energy is reaching the flange 8, and that the primary reaction to the acoustic radiation from the front of the transducer assembly is provided by the loading block.

We claim:
1. An acoustic transducer comprising:
   a hollow molded synthetic plastic housing having a side wall of generally tubular form, such housing being closed at a front end and provided with mounting means at an external periphery of a rear, open end of the housing, the front end of the housing being closed by a membrane which is integral with said synthetic plastic housing and much thinner than the side wall of the housing;
   and active transducer subassembly located within a front portion of said housing forward of said mounting means and coupled to a gaseous atmosphere into which the transducer is to radiate by a layer of acoustically transmissive matching material between the membrane and the subassembly, the rear end of the housing defining an opening large enough to admit said active transducer subassembly;

a layer of acoustic decoupling material surrounding the rear and sides of said subassembly;

a mass of potting compound surrounding said acoustic decoupling layer and filling at least said front portion of the housing to retain said subassembly therein; and a further layer of acoustic decoupling material between said potting compound and said side wall adjacent said external peripheral mounting means.

2. An acoustic transducer having an active transducer subassembly comprising a substantially rigid plate having a front substantially planar radiating surface, coupling means applied to the radiating surface and comprising at least one layer of acoustic propagation material of acoustic impedance intermediate between that of the material of the plate and that of a gaseous atmosphere into which the plate is to radiate, a driver assembly rigidly secured to an opposite rear surface of the plate and comprising a loading block, a piezoelectric element between the loading block and the plate, means maintaining the piezoelectric element acoustically coupled to the plate and to the loading block, and means establishing electrical connections to the piezoelectric element to permit excitement of the latter at a predetermined frequency and on an axis of the driver assembly perpendicular to the radiating surface; and a passive portion comprising an elongated tubular housing, moulded from a synthetic resin and defining a passage which is open at one end and closed at an opposite end by a thin, integral wall coupled by said coupling means to the plate, the housing having internal cross-section dimensions greater than those of said plate and said driver assembly and a longitudinal axis common with that of said driver assembly, a wrapping of acoustically decoupling material surrounding the plate and driver assembly except for the front surface of the plate, a mass of somewhat elastomeric potting compound surrounding said wrapping within the housing and mounting the assembly within said other end of the passage with the coupling means contacting said thin integral end wall, an external mounting ring through which the transducer is mounted, the mounting ring surrounding the housing to the rear of the loading block of the driver, and a layer of acoustic decoupling material between the housing and the potting material within the mounting ring.

3. An acoustic transducer according to claim 2, wherein the active transducer assembly has a mass which is between 25% and 75% of that of the whole transducer.

4. An acoustic transducer according to claim 2, wherein the active transducer assembly is cylindrical with a diameter which is at least 75% of an internal diameter of the housing.

5. An acoustic transducer according to claim 2, and further including a layer of acoustic decoupling material between the potting compound and the inside surface of the side wall of the housing adjacent the driver assembly.

6. An acoustic transducer according to claim 2, and further including a layer of acoustic decoupling material overlying the potting compound at said open end of the housing.

* * * * *